(12) United States Patent
Koschella et al.

(10) Patent No.: US 6,530,005 B2
(45) Date of Patent: Mar. 4, 2003

(54) CIRCUIT ARRANGEMENT AND METHOD FOR CREATING AND RETRIEVING PATCH DATA FROM MEMORY

(75) Inventors: Dietmar Koschella, Denzlingen (DE); Joerg Franke, Freiburg (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/753,494

(22) Filed: Jan. 2, 2001

(65) Prior Publication Data

US 2001/0013091 A1 Aug. 9, 2001

(30) Foreign Application Priority Data

Dec. 30, 1999 (DE) .......................................... 199 64 003

(51) Int. Cl.[7] .............................. G06F 12/00; H02H 3/05; H03K 19/003
(52) U.S. Cl. ....................... 711/165; 711/102; 711/152; 711/163; 714/8
(58) Field of Search ................................. 711/154, 103, 711/104, 108, 165, 102, 152, 163; 714/8, 7, 6; 713/100; 710/14, 51

(56) References Cited

U.S. PATENT DOCUMENTS

| | | | | |
|---|---|---|---|---|
| 4,982,360 A | * | 1/1991 | Johnson ...................... | 711/108 |
| 5,796,746 A | * | 8/1998 | Farnworth et al. ........... | 714/718 |
| 5,901,225 A | | 5/1999 | Ireton et al. .................... | 380/4 |
| 6,037,803 A | * | 3/2000 | Klein ........................... | 326/86 |
| 6,169,700 B1 | * | 1/2001 | Luo ....................... | 365/230.05 |
| 6,260,157 B1 | * | 7/2001 | Schurecht et al. ............. | 714/8 |

* cited by examiner

*Primary Examiner*—Do Hyun Yoo
*Assistant Examiner*—Kimberly N. McLean
(74) *Attorney, Agent, or Firm*—Samuels, Gauthier & Stevens LLP

(57) ABSTRACT

The invention relates to a circuit arrangement and to a method for creating and retrieving replacement data. The circuit arrangement has a programmed ROM, which is coupled to a patch-memory module through an address and data bus. The patch-memory module has a plurality of patch-data registers and patch-address registers, in which the addresses and replacement data are stored. The invention makes it possible that a hard-wired and thus irreversibly programmed ROM can be modified and corrected by an external circuit arrangement. For example, erroneous instructions of program sequences and data can be replaced by error correction instructions during a ROM access of the program-controlled unit. By using dedicated registers, the RAM essentially can be dispensed with for error correction, while retaining the retrieval speed.

16 Claims, 3 Drawing Sheets

CIRCUIT ARRANGEMENT AND METHOD FOR CREATING AND RETRIEVING PATCH DATA FROM MEMORY

BACKGROUND OF THE INVENTION

The present invention relates to a programmable integrated circuit device, and in particular to a integrated device that facilitates modifying executable program instructions and/or data stored on the integrated circuit device.

Microprocessors, signal processors, and the like have been known for many years in the various designs. These program-controlled units are often designed to execute programs stored in a program memory that is located within the program-controlled unit.

Non-volatile memory devices, such as a ROM, are frequently used as program memory, and may be external to or integral with the program controlled unit. However, a problem with the use of a ROM is that it is difficult to change the contents of the memory device when the executable instructions and/or data stored therein need to be updated. For example, when a new version of software/firmware is released. Replacing the ROM in its entirety with a new ROM that includes the updated firmware is often difficult and expensive.

One technique for updating the firmware is to use a transfer instruction that modifies the old/defective program code (i.e., a patch). This transfer instruction is executed when the program accesses this defective program code at a pre-specified address assigned to this program code. For every defective program code in the ROM, a certain amount of storage space in an internal or external non-volatile memory device (i.e., a RAM) is made available to accommodate the follow-on instruction associated with the transfer instruction (i.e., interrupt service routine). When the system is being initialized, the addresses assigned to the old/defective program codes are programmed in a register assigned to the respective transfer instruction, and the associated transfer follow-on instructions are loaded into the system RAM. Modified or corrected transfer follow-on instructions of this kind are often referred to as error correction instructions or patches and the associated memory is referred to as patch memory. The data for the transfer follow-on instructions can be loaded into the system RAM from a system EEPROM or through an external interface.

Individual erroneous program codes may be corrected in this way, but a considerable amount of storage in the system RAM is necessary for this, and therefore RAM storage space is no longer available for further tasks.

In addition, an erroneous program code cannot be corrected or manipulated directly, but rather only through the detour of a transfer instruction and its associated follow-on instruction. When a single erroneous byte appears in a program table that is used in many program sequences, all these program sequences must be corrected and/or manipulated. Since a separate interrupt is needed for this every time, for which a correspondingly large amount of storage space must be made available on the system RAM, this technique quickly becomes rather complicated.

Another problem with the prior art techniques is that the execution time of each erroneous program code is increased by the time needed for the interrupt. This is especially undesirable in the case of erroneous program codes that are frequently addressed during execution of a program, since this may substantially reduce the performance of the entire system.

Therefore, there is a need for a technique that allows executable program instructions/data to be easily updated within a programmable integrated circuit device.

SUMMARY OF THE INVENTION

Briefly, according to an aspect of the present invention, a circuit arrangement for replacement of executable program instructions and data includes a data bus, an address bus, a memory device that is coupled to the address and data buses to store executable program instructions and data, and a programmable patch-memory module also coupled to the address and data buses. The patch memory module includes a patch address data storage device that stores and provides a patch address value indicative of an address within the memory device the contents of which is being updated, and a comparator that is coupled to the address bus and compares an address signal value on the address bus with the patch address value. The comparator provides a comparator status signal indicative of whether or not there is a match. The patch memory module also includes a patch data storage device that stores a patch data value, and outputs the patch data value onto the data bus when the comparator status signal indicates a match.

The present invention facilitates correction of erroneous instructions or program sequences. For example, an address belonging to the datum that needs to be replaced is read in by the memory device via the data/address bus (as usual) and also, at the same time, by the patch-memory module. The patch-memory module compares the addresses forwarded via the data/address bus to the memory with a given address pattern stored in the patch address data storage device within the module. If the address pattern in the patch-memory module agrees with the address on the address bus, the patch memory module outputs a patch data value onto the data bus, rather than allowing the memory device to output data in response to the address on the address bus.

The circuit arrangement preferably is an integrated circuit (i.e., the memory device and the patch-memory module are integrated on one semiconductor chip). The address/data bus is an internal bus. Consequently, the patch-memory module accesses the internal address/data bus quickly and is synchronized with access to the memory.

In one embodiment, through the use of dedicated registers (i.e., the patch-address registers, and the patch-enable register) the RAM essentially can be dispensed with for error correction. Only if correcting large erroneous program sequences, which are larger than the number of implemented patch data memories, does it make sense to branch off into the RAM. This can be implemented, for example, by a transfer instruction that branches off to a new, improved program sequence in the RAM. Thus even complex software or program modules can be inserted or replaced.

An advantage of using patch-data memories and patch-address memories structured as registers is the relatively delay-free access. In known patch-memory modules, the data that needs to be replaced or corrected are typically stored in a RAM or ROM. To replace the erroneous data with the error-free ones from the patch-data memory, access to the patch-data memory is required thus significantly reducing the data read-out speed, especially if the data needing to be replaced occurs very frequently during the program execution. Structuring the patch-data memory and patch-address memory respectively as a hard-wired logic circuit and as registers assures that the data can be read out and replaced almost without delay.

Data can also be replaced. For example, if a single byte needs to be changed in a table that is used simultaneously in several program sequences, this may be performed by simply changing this one byte.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
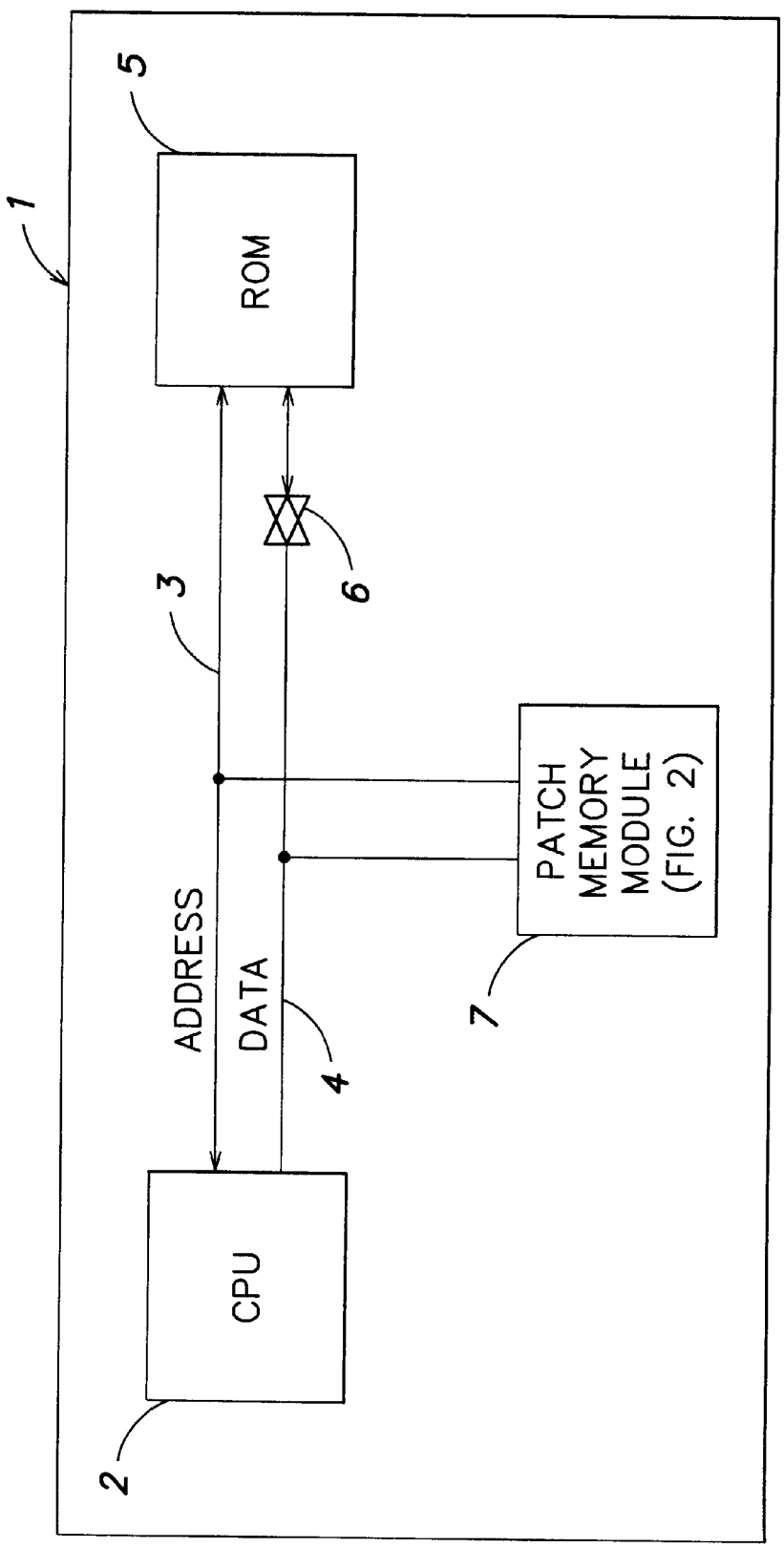
FIG. 1 is a block diagram illustration of a program-controlled unit that includes a patch-memory module, structured as a microcontroller.

FIG. 1 is a block diagram illustration of a program-controlled unit 1. Only the units necessary to describe the invention are shown in the program-controlled unit 1, which in this embodiment is structured as a microcontroller. Therefore, in this embodiment the program-control unit is preferably monolithically integrated on a single chip.

The program-controlled unit 1 includes a central computing unit (CPU) 2 that is coupled through an address bus 3 and a data bus 4, to the system memory 5 (e.g., a ROM). A transfer gate 6 is switched onto the data bus 4. The programmed control unit 1 also includes a patch-memory module 7 that is connected to the address bus 3 and the data bus 4.

For the sake of simplicity, FIG. 1 does not illustrate the control bus that is typically present in the program-controlled unit 1, and that controls the bus and bus arbitrations. Such a control bus may be implemented separately or also by an address bus in multiplex operation.

Figure 2:
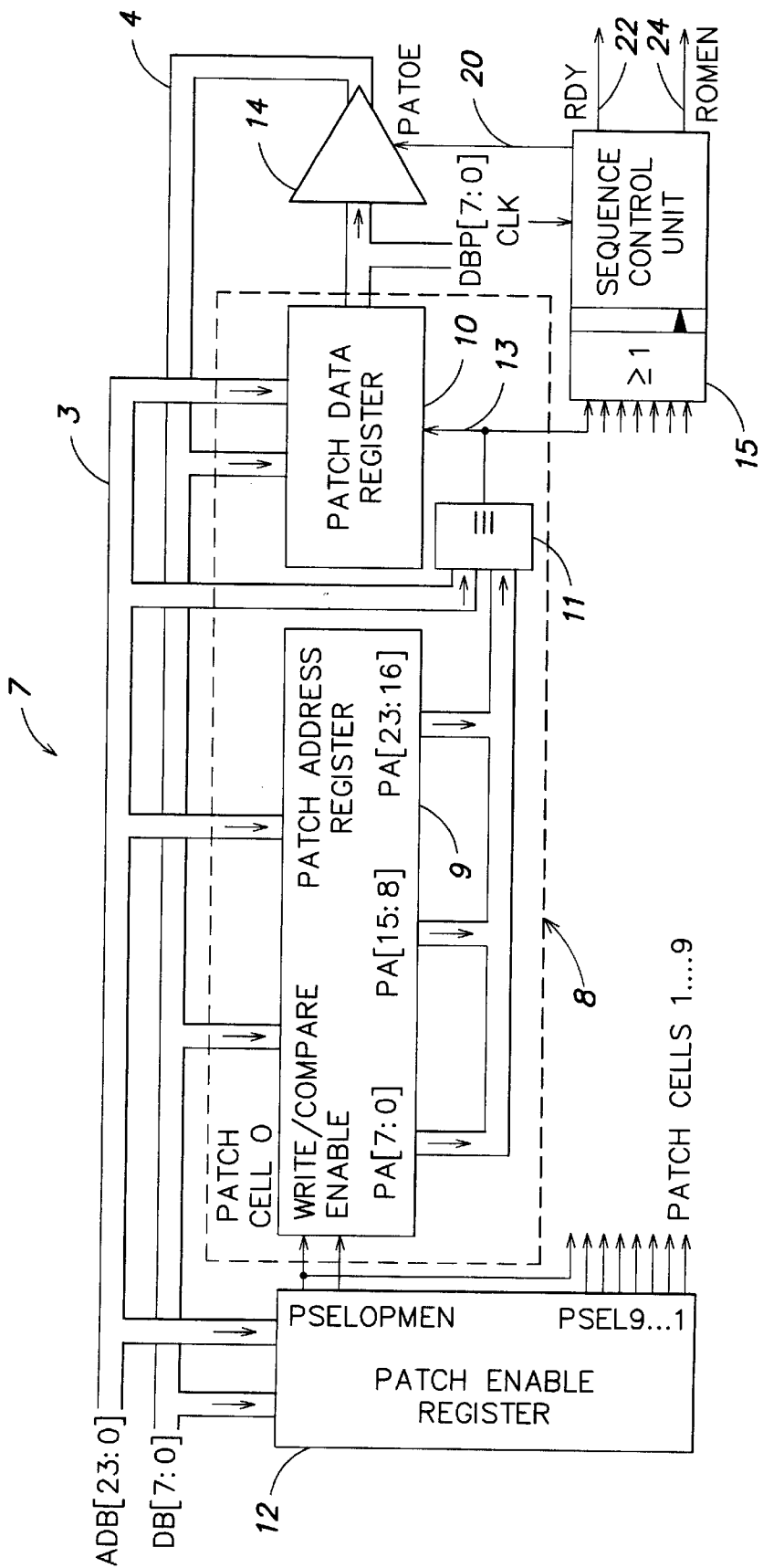
FIG. 2 is a block diagram illustration of the patch-memory module of FIG. 1.

FIG. 2 is a block diagram of the patch-memory module 7. The module 7 preferably includes a plurality of patch-memory cells 8 (e.g., ten). For the sake of clarity, only one such patch-memory cell 8 is illustrated in FIG. 2. Each patch-memory cell 8 includes a patch-address register 9, a patch-data register 10, and a comparator circuit 11 situated between the registers 9, 10. The patch-memory module 7 also includes a patch-enable register 12 that actuates the patch-memory cells 8. In one embodiment, each patch-memory cell 8 may be activated through a patch-mode control signal (PMEN) and a patch-memory-cell enable signal (PSEL) from the patch enable register 12.

The input of the patch-address register 9 is connected to the 24-bit address bus 3 (ADB[23:0]), and the patch-address register generates and outputs three one-byte addresses. The patch-data register 10 is connected to both the address bus 3 and the eight-bit data bus 4 (DB[7:0]). The comparison circuit 11 receives the address outputs of the patch-address register 9 and the address bus 3, and provides a data-register enable signal on a line 13 that controls the patch-data register 10. The output of the patch-data register 10 may be connected to the data bus 4 either directly or through a data-bus driver circuit 14.

The data-bus driver circuit 14 is preferably configured as an open-drain driver circuit. The driver circuit 14 is controlled by a sequence control unit 15. The sequence control unit 15 controls the data-bus arbitration through a control signal PATOE on a line 20, and ensures that at any moment no more than one patch-data register 10 has access rights and thus can write data on the data bus 4.

In one embodiment, one comparison circuit 11 is associated with each patch-memory cell 8. However, it is contemplated that a single comparison circuit 11 may be provided for all the patch-memory cells 8. The comparator 11 is preferably configured and arranged to have the same address width as the address bus 3. However, the comparator 11 may be configured to process the addresses of the address bus 3 and the patch-address register 9 byte-by-byte.

Figure 3:
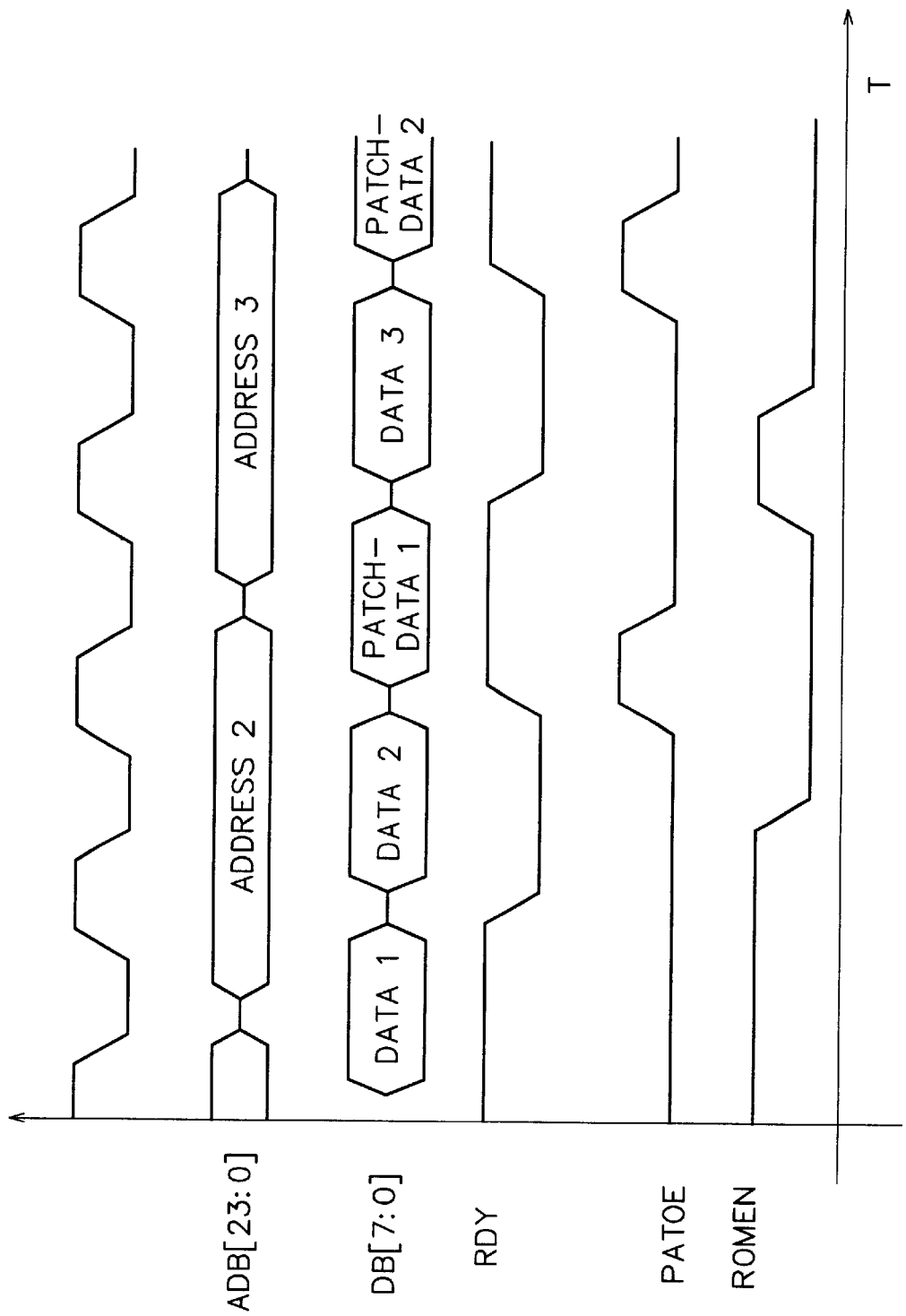
FIG. 3 illustrates a timing diagram, which shows the time sequence for creating and retrieving error correction instructions and/or data from the patch-memory module.

The operation of the patch-memory module 7 will be explained in more detail below in with reference to FIG. 3, which illustrates a timing diagram associated with the sequence of retrieving error correction instructions from the patch-memory module 7. The operation of the patch-memory module 7 shall be discussed in the context of several operating modes.

System Initialization

The system is initialized following a power-up, a restart (RESET), or in a special mode (e.g., supervisor or service) of the program-controlled unit 1. The patch-memory cells 8 are actuated in a write mode (WRITE) through the patch-mode control signal PMEN. To initialize one of the patch-memory cells 8, the corresponding patch-address register 9 is enabled through a patch-memory cell enable signal PSELx. A single 24-bit address may then be written into the patch-address register 9, and the error correction instruction (Patch) associated with this address may be written to and stored in the patch-data register 10. This process may be repeated for the remaining or individual patch-memory cells. The particular patch-memory cells 8 to be written to may be addressed by an address pointer (not shown). The 24-bit addresses may be written into the patch-address registers 9 sequentially byte-wise (8-bit), 4-bitwise, or the like.

The addresses or data (error correction instructions) that are written into the patch-address register 9 and patch-data register 10 during system initialization, can be loaded from an external memory via an internal memory or via an external interface.

Patch Operating Mode

The patch-memory cells 8 are actuated in the patch mode (COMPARE) through the patch mode control signal PMEN. In one state this signal commands the cell to the write/initialize mode, and it its opposite state to the compare/patch mode. The desired patch-memory cell 8 is enabled through the patch-memory-cell enable signal PSELx. The comparison circuit 11 then begins to compare the current addresses on the address bus 3 with the addresses stored in the enabled patch-address registers 9. If an address on the address bus 3 agrees with the address of an enabled patch-address register 9, the instruction assigned to this address in the ROM is replaced by the appropriate error correction instruction from the respective patch-data register 10 and the value within the patch data register 10 is switched onto the data bus 4.

If the comparator 11 detects a match, the sequence control unit 15 issues a wait signal RDY on a line 22. The wait signal RDY on the line 22 sets the central computing unit 2 (FIG. 1) into a wait state for the duration of at least one clock cycle CLK. Therefore, the central computing unit delays the data processing during this wait state. During the wait state, the sequence control unit 15 provides a control signal (ROMEN) on a line 24 that deactivates the ROM data bus output drivers, and in their place the error correction instruction of the respective patch-data register 10 is switched onto the data bus 4.

In case various patch-address registers 9 have the same address but have different error correction instructions in the corresponding patch-data registers 10, an access conflict on the data bus 4 can be avoided by the already delineated open-drain structure of the data bus 4. However, this can also be achieved by a suitably designed sequence control unit 15.

However, the above-mentioned wait state need not necessarily also be used in connection with address decoding.

System Reconfiguration

During a system reconfiguration, the patch-memory module 7 is driven from patch mode to write mode by the patch-mode control signal PMEN from the patch enable register. System reconfiguration then takes place in a manner similar to system initialization discussed above.

One of ordinary skill will recognize that the inventive circuit arrangement is suitable for any ROM that includes data programmed on the device, and now requires error correction data (patches). For example, the present invention is clearly applicable to units that employ non-volatile memories such as PROM and/or EPROM.

The invention also is not necessarily limited to the replacement of erroneous data or instructions. Rather, the inventive patch-memory module may be used to facilitate easily updating the software/firmware within the unit. Significantly, this allows updates/modifications to the executable code/data of the program-controlled unit 1 without replacing the ROMs within the unit.

The invention is especially useful in connection with program-controlled units designed as microcontrollers, microprocessors, signal processors, etc., which have a system ROM integrated on the chip of the program-controlled units. Significantly, with the present invention the entire program-controlled unit need not be replaced because of an erroneous ROM instruction. Specifically, only the erroneous ROM instruction is replaced on the data bus by an error correction instruction stored in the patch-memory module. Furthermore, the invention naturally can also be used for program-controlled units with a different structure, for example clock-pulse controlled sequence controls and/or state machines.

Although the present invention has been shown and described with respect to several preferred embodiments thereof, various changes, omissions and additions to the form and detail thereof, may be made therein, without departing from the spirit and scope of the invention.

What is claimed is:

1. A circuit arrangement for replacement of executable program instructions and data, said circuit arrangement comprising:

a data bus;

an address bus;

a memory device that is coupled to said address and data buses, and stores executable program instructions and data;

a programmable patch-memory module coupled to said address and data buses, wherein said programmable patch-memory module includes a patch address register that stores and provides a patch address value indicative of an address within said memory device, wherein said patch address value is associated with an address within said memory device which is being updated;

a comparator that is coupled to said address bus, and compares an address signal value on said address bus with said patch address value, and provides a comparator status signal indicative of whether or not there is a match; a patch data register, that stores a patch data value, and outputs said patch data value onto said data bus when said comparator status signal indicates a match;

a central processing unit coupled to said address and data buses to execute said executable program instructions; and a sequence control unit that receives said comparator status signal, and in response to said comparator status signal indicating an address match said sequence control unit provides a wait state output signal, wherein said central processing unit receives said wait state output signal and delays execution of said executable program instructions for a period of time in response to said wait state output signal.

2. The circuit arrangement of claim 1, comprising a plurality of said programmable patch-memory modules coupled to said address and data buses, wherein each of said plurality of programmable patch-memory modules is independently programmable to write data into said patch address register and said patch data register.

3. The circuit arrangement of claim 2, comprising a patch enable register that is coupled to said address and data buses, and is configured and arranged to provide control signals to each of said plurality of programmable patch-memory modules to enable a selected one of said plurality of programmable patch memory modules to output data onto said data bus.

4. The circuit arrangement of claim 3, wherein said patch enable register is configured and arranged to provide for each of said plurality of programmable patch-memory modules a mode signal, wherein in a first state said mode signal commands said associated one of said plurality of programmable patch-memory module into a program/write mode wherein said patch address values within said patch address register and said patch data within said patch data register may be updated, and in a second state said mode signal commands said associated one of said plurality of programmable patch-memory module to compare said address signal value on said address bus with said patch address value and provide said comparator status signal indicative thereof.

5. The circuit arrangement of claim 1, comprising a data-bus driver circuit that receives said patch data value and outputs said patch data value onto said data bus in response to said comparator status signal.

6. The circuit arrangement of claim 5, wherein said data-bus driver comprises an open-drain or precharge-evaluate driver circuit.

7. The circuit arrangement of claim 1, wherein said circuit arrangement is disposed on an integrated circuit.

8. The circuit arrangement of claim 1, wherein said circuit arrangement is configured and arranged as a microprocessor, microcontroller or signal processor.

9. The circuit arrangement of claim 7, wherein said circuit arrangement is configured and arranged as a clock-pulse driven arrangement.

10. The circuit arrangement of claim 7, wherein said circuit arrangement is configured and arranged as an asynchronous sequence control circuit.

11. A programmable integrated circuit arrangement, said circuit arrangement comprising:

a data bus;

an address bus;

a memory device that is coupled to said address and data buses, and stores executable program instructions and data;

a processing element that is coupled to said address and data bus, and executes said executable program instructions;

a programmable patch-memory module coupled to said address and data buses, wherein said programmable patch-memory module includes means for storing and providing a patch address value that is indicative of an address within said memory device which is being updated;

a comparator that is coupled to said address bus, and compares an address signal value on said address bus with said patch address value, and provides a comparator status signal indicative of whether or not there is a match; and means for storing a patch data value, and for outputting said patch data value onto said data bus when said comparator status signal indicates a match, such that said patch data value is input to said processing element for manipulation; and a sequence control unit that receives said comparator status signal, and in response to said comparator status signal indicating an address match said sequence control unit provides a wait state output signal, wherein said processing element receives said wait state output signal and delays execution of said executable program instructions for a period of time in response to said wait state output signal.

12. The programmable integrated circuit arrangement of claim 11, wherein said memory device comprises a non-volatile memory device for storage of said executable program instructions and data, wherein said means for storing and providing a patch address value includes a patch address register that stores said patch address value, and wherein said means for storing said patch data value includes a patch data register that stores said patch data value.

13. A method for operating a programmable integrated circuit arrangement that includes a data bus, an address bus, a memory device that is coupled to the address and data buses and stores executable program instructions and data, a processing element that is coupled to the address and data bus and executes the executable program instructions, a programmable patch-memory module coupled to the address and data buses and includes a patch address register that stores and provides a patch address value that is indicative of an address within the memory device which is being updated, a comparator that is coupled to the address bus and the patch address register, and a patch data register that stores a patch data value, said method comprising:

receiving a first control signal (PMEN) that causes the patch address register to operate in a patch mode;

comparing with the comparator an address value on the address bus and the patch address value, and providing a comparator status signal indicative of whether or not the compared values are equal;

outputting the patch data value onto the data bus if the comparator status signal indicates that the compared values are equal; and outputting a wait state output signal when the comparator status signal indicates the compared values are equal, wherein the processing element receives said wait state output signal and delays execution of said executable program instructions for a period of time in response to said wait state output signal.

14. The method of claim 13, comprising:

executing an initialization mode upon power-up or restart of the programmable integrated circuit arrangement that includes selecting a value of the first control signal (PMEN) to cause the patch address register and the patch data register to be write enabled;

writing an updated address value that is stored in the patch address register; and writing an updated data value that is stored in the patch data register.

15. The method of claim 14, comprising:

initiating a system reconfiguration mode in response to a reconfiguration command signal, wherein the system reconfiguration mode includes selecting the value of the first control signal (PMEN) to cause the patch address register and the patch data register to be write enabled;

writing a reconfiguration updated address value that is stored in the patch address register; and writing a reconfiguration updated data value that is stored in the patch data register.

16. The method of claim 15, wherein when the comparator status signal indicates a match, generating a wait signal (RDY) that commands the processing element into a wait state for at least a duration of one clock cycle (CLK).

* * * * *